United States Patent [19]
Zup et al.

[11] Patent Number: 5,246,213
[45] Date of Patent: Sep. 21, 1993

[54] HYDRAULIC MOUNT FOR IMPROVED IDLE AND HIGH FREQUENCY ISOLATION

[75] Inventors: Andrew K. Zup, Edgerton; James P. Hamberg, Beavercreek, both of Ohio

[73] Assignee: General Motors Corporation, Detroit, Mich.

[21] Appl. No.: 980,866

[22] Filed: Nov. 24, 1992

[51] Int. Cl.$^5$ ............................................. F16F 9/34
[52] U.S. Cl. ................................ 267/140.14; 267/219
[58] Field of Search ............... 267/140.13, 140.14, 267/140.15, 219; 180/300, 312, 902, 550; 248/562, 636, 638

[56] References Cited

U.S. PATENT DOCUMENTS

| | | | |
|---|---|---|---|
| 4,583,723 | 4/1986 | Ozawa | 267/140.14 |
| 4,588,173 | 5/1986 | Gold et al. | 267/140.13 |
| 4,681,306 | 7/1987 | Hofmann et al. | 267/140.13 |
| 4,699,099 | 10/1987 | Arai et al. | 123/192.1 |
| 4,783,062 | 11/1988 | Hamberg et al. | 267/140.14 |
| 4,789,143 | 12/1988 | Smith et al. | 267/140.14 |
| 4,796,874 | 1/1989 | Hoying et al. | 267/140.14 |
| 4,889,326 | 12/1989 | Bouhours | 267/140.14 |
| 4,958,810 | 9/1990 | Gold et al. | 267/140.13 |
| 4,969,632 | 11/1990 | Hodgson et al. | 267/140.11 |

Primary Examiner—Robert J. Oberleitner
Assistant Examiner—Chris Schwartz
Attorney, Agent, or Firm—Kevin M. Hinman

[57] ABSTRACT

A hydraulic mount assembly includes a pair of mounting members connected together through a hollow elastomeric body. This hollow body is closed by a resilient diaphragm so as to form a cavity for a damping liquid. A partition divides the cavity into a primary chamber formed between the partition and the hollow body and a secondary chamber formed between the partition and the diaphragm. The partition also includes a bypass track, a damping orifice track and a decoupler passage for providing fluid communication between the cambers. A decoupler is held for limited reciprocating movement in the decoupler opening. An actuator is provided for selectively releasing/disabling the decoupler and opening/closing the bypass track. In a first operative position, the actuator closes the bypass track and allows the decoupler to reciprocate. In a second operative position the actuator engages and disables the decoupler, seals the decoupler opening, and opens the bypass track. In a third operative position the actuator releases the decoupler to allow free reciprocating movement and the bypass track remains open.

3 Claims, 3 Drawing Sheets

HYDRAULIC MOUNT FOR IMPROVED IDLE AND HIGH FREQUENCY ISOLATION

TECHNICAL FIELD

The present invention relates generally to hydraulic mounts for vibration damping and, more particularly, to an electronically controlled hydraulic mount assembly that is tunable for optimum performance in relation to a wider range of vibration inputs.

BACKGROUND OF THE INVENTION

A variety of mount assemblies are presently available to isolate vehicle vibrations, such as for automobile and truck engines and transmission. One of the most popular mounts today is the hydraulic-elastomeric mount of the type disclosed in U.S. Pat. No. 4,588,173 to Gold et al., issued May 13, 1986, entitled "Hydraulic Elastomeric Mount" and assigned to the assignee of the present invention.

The hydraulic mount assembly of this prior invention includes a reinforced, hollow rubber body that is closed by a resilient diaphragm so as to form a cavity. This cavity is partitioned by a plate into two chambers that are in fluid communication through a relatively large central opening or passage in the plate. The first or primary chamber is formed between the plate and the body. The secondary chamber is formed between the plate and the diaphragm.

A decoupler is positioned in the central passage of the plate and reciprocates in response to the vibrations. The decoupler movement alone accommodates small volume changes in the two chambers. When, for example, the decoupler moves in a direction toward the diaphragm, the volume of the portion of the decoupler cavity in the primary chamber increases and the volume of the portion in the secondary chamber correspondingly decreases and vice versa. In this way, for certain small vibratory amplitudes and generally higher frequencies, fluid flow between the chambers is substantially avoided and undesirable hydraulic damping is eliminated. In effect, this freely floating decoupler is a passive tuning device.

In addition to the relatively large central passage, an orifice track with a smaller restricted flow passage is provided extending around the perimeter of the orifice plate. Each end of the track has an opening; one opening communicating with the primary chamber and the other with the secondary chamber. The orifice track provides the hydraulic mount assembly with another passive tuning component, and when combined with the freely floating decoupler, provides at least three distinct dynamic operating modes. The particular operating mode is primarily determined by the flow of fluid between the two chambers.

More specifically, small amplitude vibratory input, such as from relatively smooth engine idling or the like, produces no damping due to the action of the decoupler, as explained above. In contrast, large amplitude vibrating input, such as when the engine is excited at its resonant frequency or when the vehicle suspension inputs large displacements (e.g. sudden acceleration or panic stop), produces high velocity fluid flow through the orifice track, and, accordingly, a relatively high level of damping force and desirable smoothing action. A third or intermediate operational mode of the mount occurs during medium amplitude inputs experienced in normal driving and resulting in lower velocity fluid flow through the orifice track. In response to the decoupler switching from movement in one direction to another in each of the modes, a limited amount of fluid can bypass the orifice track by moving around the edges of the decoupler and through the central opening, thereby smoothing the transition.

This basic mount design has proved quite successful and represents a significant advance over the prior art engine mounts and particularly those of the solid rubber type. More specifically, hydraulic mounts provide a more favorable balance of load support and damping control. It should be appreciated, however, that additional improvement in operating characteristics is possible, and indeed, to a significant degree, substantial progress has been made recently.

More recent developments in hydraulic mount technology have led to the advent of electronic control of the dynamic characteristics of the mount. Advantageously, such a mount allows active rather than passive control. Thus, more efficient and effective isolation of vibration and suppression of noise may be provided. A previously developed hydraulic mount of the active control type is disclosed in U.S. Pat. No. 4,783,062 to Hamberg et al., issued Nov. 8, 1988, entitled "Electronic Hydraulic Mount-Internal Solenoid" and assigned to the assignee of the present invention.

In this mount assembly the partition includes at least two passages connecting the primary and secondary chambers. One of the passages may be a central opening but no decoupler is specified in the preferred embodiment. A sliding gate extends across the entry to the central opening. Two other passages of varying length form independent orifice tracks providing unique damping characteristics tuned to isolate selected frequencies of vibration and provide the desired engine control. This gate is displaceable to direct the flow of fluid between the primary and secondary chambers through a selected passage or passages in the partition.

A solenoid actuator mounted on the partition includes multiple electric coils that allow the positive positioning of the gate. A control circuit with on-board transducers is provided to monitor vehicle operating and road conditions. A microprocessor acts in response to the sensed conditions causing the necessary sequential energization of the series of coils to properly position the gate and provide the desired damping characteristics.

The mount assembly described in the Hamberg et al. patent is particularly adapted for tuning to the resonance frequencies characteristic of the vehicle component being damped. This allows the mount assembly to more efficiently and effectively isolate vibrations and suppress noise over a wide range of vehicle operating and road conditions.

While the mount assembly disclosed in the Hamberg et al. patent may be very effectively tuned to provide the desired damping characteristics, still further progress and improvements in the active mount assembly design are possible. More particularly, it is now contemplated to provide a mount assembly that incorporates the best of both active and passive tuning features. In doing so, for simplicity of design and low cost, the basic decoupler design, plural orifice tracks and solenoid control that have been used in the past and are proven to be reliable in operation, are selected to be included. However, to provide operating characteristics more suited to particular applications and enhance the efficiency for a still wider range of vehicle operating conditions, the manner in which these features are combined is responsive to solenoid operation.

In this regard, it is particularly desirable to provide the improved mount assembly with up to five distinct operating modes rather than the standard three, each mode having enhanced operating efficiencies. In a first operative position of a control element, the mount assembly should provide the three standard or normal passive modes of operation; i.e. the same proven operative modes provided by the mount assembly disclosed in U.S. Pat. No. 4,588,173 to Gold et al. (as described above) are to be brought into play.

More specifically, in the first mode, the decoupler is to reciprocate without seating in response to low or small amplitude, generally higher frequency vibrations occurring during normal vehicle idling or other low load operation. Small volume changes in the two chambers are to be accommodated to in effect soften the mount, by eliminating unnecessary damping, and to isolate noise. In contrast, in the second mode, the decoupler is to seat in response to high or large amplitude, low frequency vibration, such as can occur at the resonant frequency of the component. As a result, generally high volume flow is to be generated through the damping orifice track. This provides the necessary high damping rate for engine (or other component) control. In a third mode, generally medium amplitude, low frequency vibration, encountered mainly during normal driving, is to produce intermediate fluid flow through the orifice track and moderate damping.

In a second operative position of the control element, the mount assembly is to provide a fourth mode that furnishes a reduced dynamic rate particularly adapted to provide more complete isolation of low or small amplitude, low frequency vibrations/noise, such as occur during engine idle in a stationary vehicle.

In a third operative position the fifth mode is to furnish significantly improved tuning of low amplitude vibrations in a range of higher frequencies from approximately 10 to 200 Hz.

It would also be desirable for this fifth operational mode to allow the assembly to fully compensate for the changing flow characteristics of the hydraulic fluid that is believed to take place at these relatively higher frequencies; i.e. the fluid transitions from laminar to turbulent flow causing a change in expected operational characteristics. As a result of the turbulent flow, both the decoupler passage and orifice track(s) become restricted, eventually becoming effectively choked off. This prevents continued fluid flow between the chambers that is critical for proper damping and vibration/noise control. The flow cut-off results in a significant pressure buildup in the primary chamber of the mount that causes a very sharp increase in the dynamic rate characteristics. The resulting increase in stiffness caused by the high dynamic rate prevents the best suppression and isolation of low amplitude/relatively high frequency vibrations. A need is therefore identified for a mount assembly providing improved tuning of the higher frequencies; that is, in the range of 10–200, and particularly in the low-to-medium part of the range.

SUMMARY OF THE INVENTION

Accordingly, it is a primary object of the present invention to provide a hydraulic mount assembly incorporating both passive and active tuning features that overcome the above-described limitations and disadvantages of the prior art.

Another object of the present invention is to provide a hydraulic mount assembly for an operating component of a vehicle furnishing variable damping and dynamic rate characteristics that may be tuned to provide proper response, including the desired balance of isolation and control depending upon the frequency and amplitude of the vibratory input.

Yet another object of the present invention is to provide a hydraulic mount assembly providing significantly improved tuning that allows isolation of troublesome low amplitude vibratory inputs in a range of frequencies between 10 and 200 Hz.

Another object of the present invention relates to providing a mount assembly incorporating a passive tuning decoupler, a bypass track, an active interrupter means for the decoupler/tuning gate for the bypass track and a damping orifice track. By selectively interrupting the operation of the decoupler and/or opening/closing the bypass track, it is possible to improve engine idle isolation characteristics. This is particularly true in response to low or small amplitude vibratory inputs having frequencies at the low and upper ends of the 10 to 200 Hz range.

Still another object of the invention is to provide an improved hydraulic mount assembly providing five distinct modes of operation so that the mount is fully responsive to low amplitude, higher frequency and high amplitude, low frequency vibratory inputs occurring during normal vehicle operation; low amplitude, relatively lower frequency vibratory inputs occurring during idle; and low amplitude, relatively higher frequency vibratory inputs under conditions when turbulent flow chokes-off normal decoupling function in many mount assemblies of prior art design. Accordingly, the desired balance between isolation and control is provided under substantially all reasonably foreseeable operating conditions.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hydraulic mount assembly for an operating component of a vehicle is provided. The mount assembly is particularly adapted to produce variable damping characteristics that are both passively and actively tuned to provide the necessary vibration isolation and damping of component displacements ideally suited for smooth vehicle operation.

The preferred embodiment of the mount assembly selected to illustrate the invention includes a pair of mounting members connected to each other through a hollow elastomeric body of natural or synthetic rubber. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm.

The partition further includes a damping orifice track, a bypass track and a decoupler passage for providing fluid communication between the primary and secondary chambers. A decoupler is captured for limited reciprocating movement within the decoupler passage. According to an important aspect of the invention, actuating means are provided for selectively releasing/disabling the decoupler and selectively opening/closing the bypass track.

More particularly, the actuating means may include a solenoid, a slide rod and a three-position gate mounted to a distal end of the slide rod. Preferably, the gate includes a wedge for engaging and thus disabling the decoupler. Preferably, a spool type decoupler is utilized so that the tapered end of the wedge-like gate may engage under the edge of the decoupler.

In a first or normal operating position, the gate closes the bypass track and releases the decoupler to allow reciprocation in the decoupler passage. Accordingly, normal damping characteristics are provided in response to vibration. Particularly, low or small amplitude, higher frequency vibratory inputs produce substantially no damping due to the reciprocating action of the decoupler which accommodates small volumetric changes in the primary chamber (but allows the passage of a limited volume of fluid around the decoupler).

In contrast, high or large amplitude, low frequency vibratory inputs, such as occur at resonant frequencies and during heavy engine loading caused by sudden acceleration or panic stop, serve to seat the decoupler thereby sealing the decoupler passage. Accordingly, high velocity fluid flow is produced through the damping track to provide a high level of damping force and desirable smoothing action or control of engine motion. Similarly, medium amplitude, low frequency vibratory inputs produce an intermediate velocity level of fluid flow through the damping track to provide the desired intermediate level of damping action and good noise isolation.

In a second position, the gate engages under the lip of the decoupler holding the decoupler in a skewed position wherein the decoupler passage is substantially sealed. The bypass track is, however, opened to allow direct flow between the primary and secondary chambers and thereby provide a low dynamic rate for isolation of low amplitude, high frequency vibrations occurring at the lower end of the range. Such vibrations occur during engine idle with the vehicle in a stationary position.

In a third operative position, the gate is disengaged from the decoupler thereby allowing free reciprocating movement thereof and the bypass track is also maintained open. In this position, a low dynamic rate is provided, particularly for enhanced suppression and isolation of low amplitude, relatively higher frequency noise at the upper end of the operative range. The open bypass track serves to relieve any potential for fluid pressure build-up in the primary chamber.

More particularly, in prior art mount assembly designs, high frequency vibratory inputs resulting in rapid changes in the direction of decoupler movement often create a turbulence in the area of the decoupler passage. This turbulence serves to restrict flow eventually reaching a level where flow is effectively choked-off. In the past, this has resulted in significant building of pressure in the primary chamber and increases in the dynamic rate. The resulting "stiff" mount assembly is incapable of providing the desired isolation of low amplitude, relatively higher frequency vibration/noise, that is then transmitted through the vehicle frame to the passenger compartment.

Advantageously, by relieving this pressure buildup through the bypass track, the mount assembly of the present invention effectively isolates and eliminates this problem. Further, it should be appreciated that the mount assembly does this while maintaining other operational modes that provide the desired level of damping to control engine displacements during normal vehicle operation.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
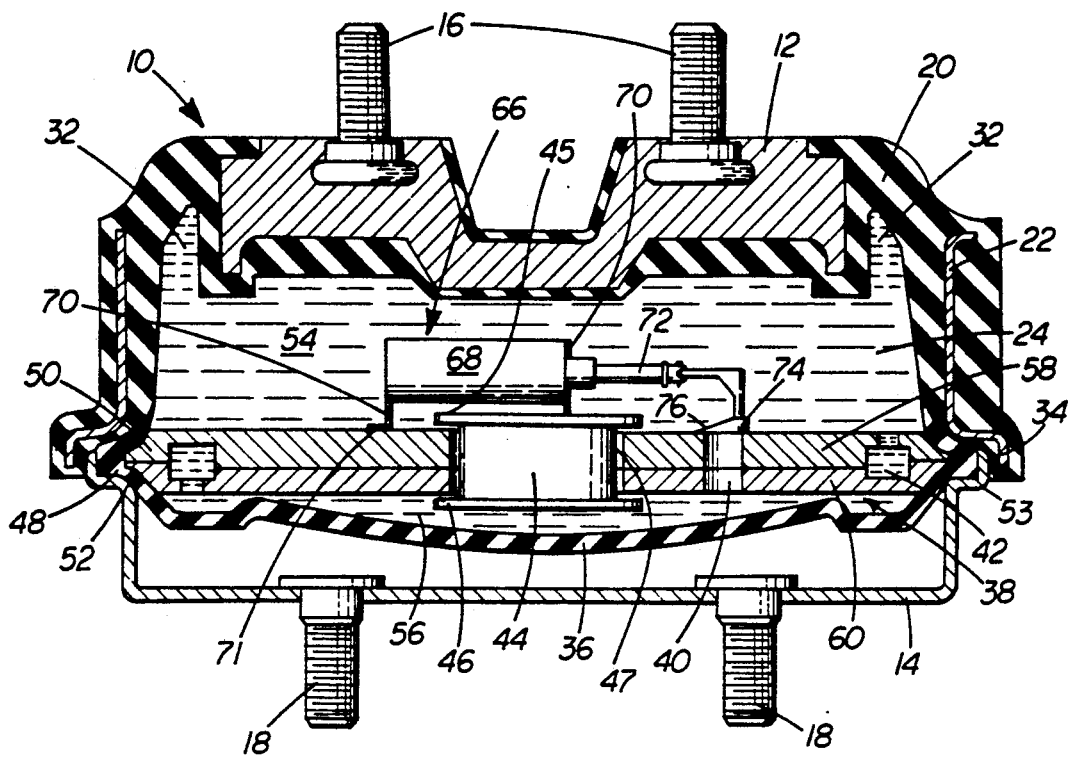
FIG. 1 is a cross-sectional view of the hydraulic, mount assembly of the present invention.
Figure 2:
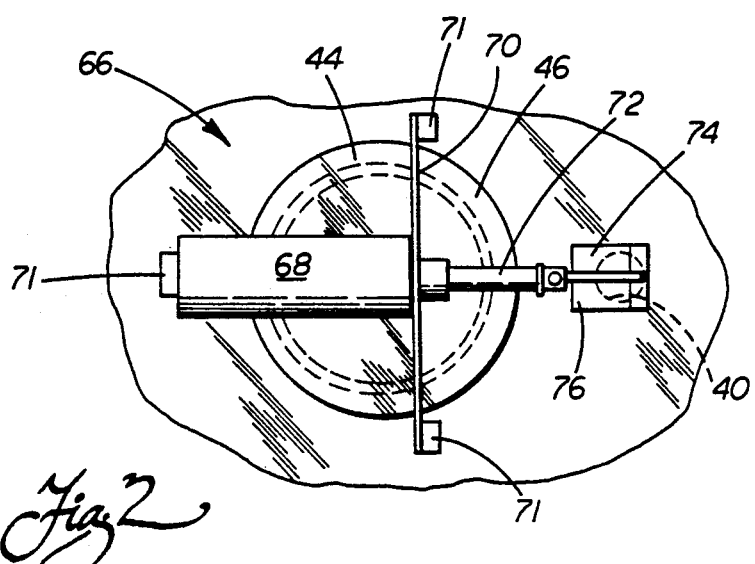
FIG. 2 is a cut-away plan view of the top plate of the partition showing the actuator including the gate.

Reference will now be made in detail to the present preferred embodiment of the invention, an example of which is illustrated in the accompanying drawing.

DETAILED DESCRIPTION OF THE INVENTION

Reference is now made to the drawings, showing the improved hydraulic mount assembly 10 of the present invention particularly adapted for mounting an internal combustion engine and/or transmission in a vehicle. The dynamic characteristics of the mount assembly 10 may be tuned to meet the needs of the specific application. As a result, the desired dynamic rate best suited to isolate a particular range of vibrations/noise conditions may be obtained.

The mount assembly 10 includes a cast aluminum mounting member 12 and stamped sheet metal mounting member 14. The mounting members 12 and 14 each have a pair of studs 16, 18, respectively. These studs 16, 18 project outwardly from the mounting members 12, 14 for attachment, respectively, to an engine (not shown) and an engine supporting cradle or frame of a vehicle (not shown). A hollow elastomeric body 20 interconnects the mounting members 12, 14. The body 20 is constructed of natural or synthetic rubber. More specifically, the body 20 may be molded to and about the mounting member 12 and to both the interior and exterior of an oval shaped stamped sheet metal retainer 22.

The body 20 is configured to form a hollow cavity 24 for receiving a damping liquid, such as a commercial engine antifreeze coolant. Voids 32 are provided in the body 20. These voids 32 assist in providing directional dynamic rate control within the elastomeric body 20 and are part of the damping liquid cavity 24. As is known in the art, such voids 32 are especially useful in isolating certain internal combustion engine vibrations.

Together, the mounting member 12, elastomeric body 20 and metal retainer 22 form a first subassembly or cover of the mount assembly 10. The retainer 22 includes an outwardly projecting collar 34 at its lower periphery. The collar 34 is formed to receive a second subassembly or base. This second subassembly comprises the mounting member 14, an elastomeric diaphragm 36 of natural or synthetic rubber, and a partition 38 with a bypass track 40 and a damping orifice track 42 providing damping liquid flow (see FIG. 1). As will be described in more detail below, a hydraulic damping decoupler 44 is captured for limited reciprocal movement within the partition and generally aligned in the center of the mount assembly 10.

The decoupler 44 is shown as being round and of the spool type. Such a decoupler 44 includes upper and lower enlarged faces providing annular lips 45, 46, respectively, that define a clearance 47 about the entire periphery of the decoupler. The decoupler 44 is mounted for limited, but free, up and down reciprocal movement in the partition 38 formed by upper and lower plates 58, 60. More particularly, the clearance 47 is sufficient to permit the desired reciprocal movement of the decoupler in response to the momentary differential pressure of the damping liquid within primary and secondary chambers 54, 56.

The elastomeric diaphragm 36 includes an annular rim section 48 having a radially inwardly facing internal groove formed between upper and lower shoulders 50, 52, respectively. The shoulders 50, 52 are flexible so as to receive the periphery of the partition 38. Thus, the periphery of the partition 38 is sealingly engaged by the shoulders 50, 52 on opposite sides of the groove.

The lower mounting member is formed with a collar 53 to receive the rim 48 of the diaphragm 36. The collar 53 of the mounting member 14 fits within the collar 34 of the retainer 22. As is known in the art, tabs (not shown) may be provided in the collar 34 and bent over to retain the whole mount assembly together.

The elastomeric diaphragm 36 closes the elastomeric body 20 so as to form therewith the closed damping cavity 24. The cavity 24 is divided by the partition 38 into the primary chamber 54 enclosed by the elastomeric body 20 and the secondary chamber 56 enclosed by the diaphragm 36.

The partition 38 is formed of die cast metal (as shown) or may be plastic and includes the plates 58, 60 with matching peripheries. These plates 58, 60 span the cavity and cooperate to define the bypass track 40 and damping orifice track 42 for communication with the secondary chamber 56. Of course, the tracks 40, 42 may be formed to a selected length and/or width so as to provide the mount with desired passive damping characteristics.

The operating characteristics of the mount assembly 10 may be actively tuned by operation of a solenoid controlled actuator, generally indicated by reference numeral 66, in accordance with the present invention. As shown, the actuator 66 includes a solenoid 68 mounted in a fixed position on a rigid mounting bracket 70, supported on feet 71, so as to span the decoupler 44. It should be appreciated that the solenoid 68 is spaced sufficiently from the decoupler 44 so as to not engage the decoupler or restrict flow during operation.

A slide rod 72 extends from the solenoid 68. A gate 74 is mounted to the distal end of the slide rod 72. As shown, the gate 74 is wedge-shaped and thus includes a tapered leading edge 76 that functions to disable the decoupler and thereby provide more efficient operation of the mount assembly 10 under certain operating conditions in a manner described in greater detail below.

Figure 3A:
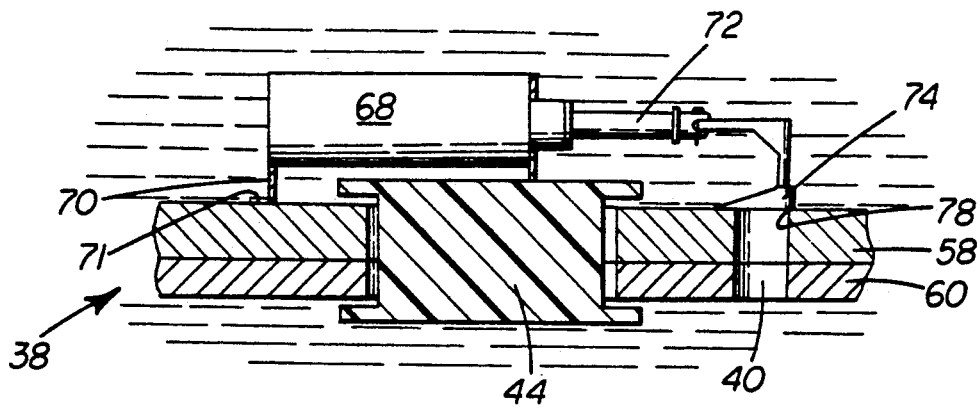
FIGS. 3a–3c are detailed, schematical views in elevation showing the actuator of the present invention in the first, second and third operative positions, respectively.

In accordance with the operation of the actuator 66, the gate 74 may be selectively positioned through the solenoid 68 to provide one of three desired operating positions providing five operating modes. More particularly, the gate 74 may be selectively displaced into a first or normal operating position (see FIG. 3a), wherein the gate 74 extends across and blocks the opening 78 leading to the bypass track 40. Accordingly, the bypass track 40 is effectively sealed and damping liquid flow through the bypass track is prevented.

Normal, free-floating operation of the decoupler 44 and the three standard modes of operation are provided, when the gate 74 is in this first position. Thus, decoupling action is provided through reciprocation of the decoupler 44 in the partition 38. This decoupling action provides isolation of low amplitude, higher frequency vibrations occurring during normal vehicle operation. In contrast, for the next two operational modes, both high and medium amplitude, low frequency vibrations serve to seat the decoupler 44, closing the decoupler passage and thereby requiring fluid to flow between the chambers 54, 56 by means of the damping track 42. Accordingly, high or intermediate velocity fluid flow is provided to produce the desired damping action that controls engine displacements.

Figure 3B:
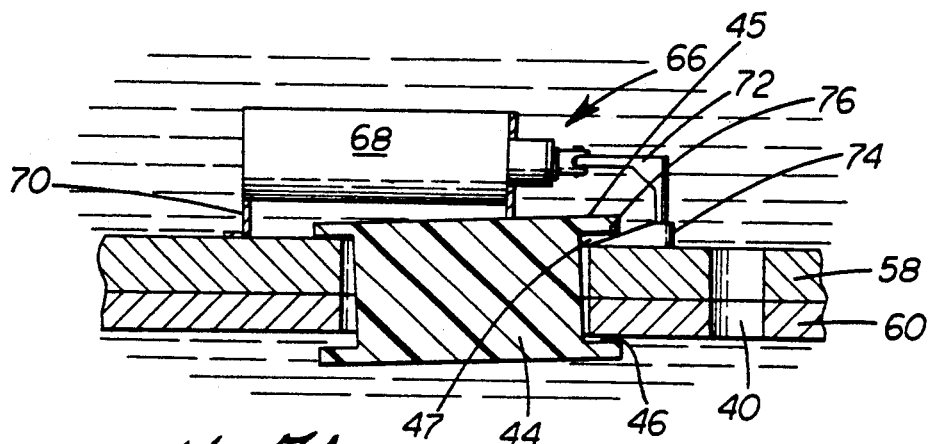

In a second operating position, the gate 74 is positioned to engage the decoupler 44 (see FIG. 3b). The tapered leading edge 76 of the wedge-shaped gate 74 slides under the lip 45. This action serves to wedge or force the decoupler 44 upwardly into a skewed position to disable it and substantially seal the decoupler passage. Accordingly, fluid flow around the decoupler 44 through the decoupler passage is substantially prevented. It should be appreciated, however, that the bypass track 40 is maintained open to provide a direct "flow through" passageway between the primary and secondary chambers 54, 56. The relatively large bypass track 40 provides little resistance to flow. Accordingly, a fourth mode of operation is provided wherein low or small amplitude, higher frequency vibrations, such as produced during engine idling and at a time when the vehicle is stationary, are effectively isolated through the provision of a "soft" assembly 10. Such vibrations are found at the low end of the 10 to 200 Hz frequency range.

Figure 3C:
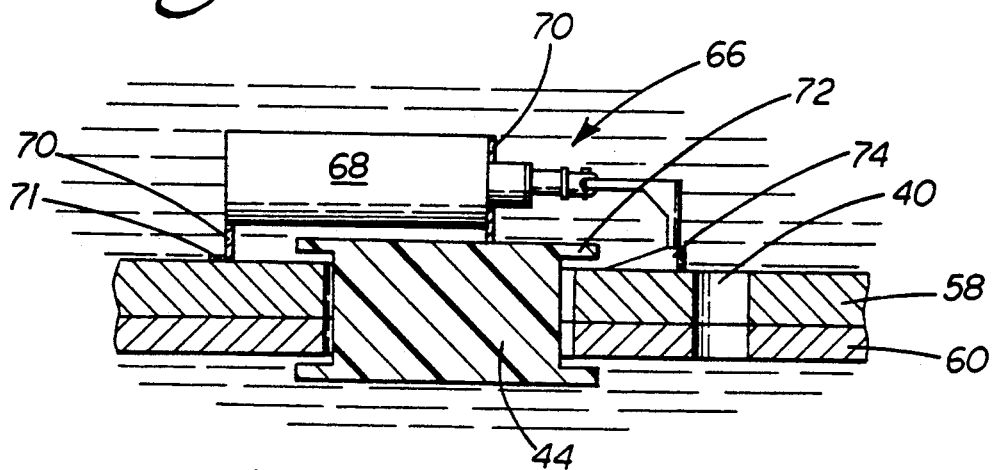

In a third operating position, the gate 74 is positioned (as shown in FIG. 3c) in a neutral position between the decoupler 44 and the bypass track 40. Accordingly, normal reciprocal operation of the decoupler 44 is provided with the bypass track 40 open to allow the free exchange of fluid between the primary and secondary chambers 54, 56. Advantageously, this resulting fifth operating mode prevents any buildup of pressure in the primary chamber that would otherwise result from the high frequency pumping action of the mount. Accordingly, a low dynamic rate is maintained for suppression of low amplitude, relatively higher frequency vibration/noise. These fourth and fifth modes add substantially to the overall comfort rating of the mount assembly 10, and results in maximized passenger comfort.

Figure 4:
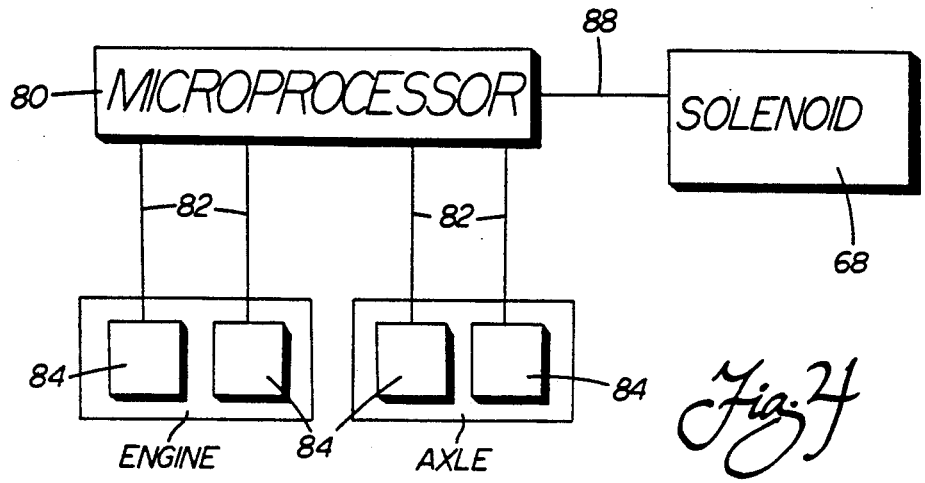
FIG. 4 is a schematical representation of the control circuit of the mount assembly of the present invention.

As shown in FIG. 4, the mount assembly 10 includes a microprocessor controller 80 connected through signal feed lines 82 to a series of transducers 84. More specifically, the transducers 84 monitor engine speed and vehicle speed. In addition, for example, they may monitor the frame oscillation, the movement of a suspension component or other operational parameter of the vehicle.

Upon sensing an engine speed above that associated with idle and/or a vehicle speed other than zero, or other suitable threshold of the selected parameter, the microprocessor 80 sends a signal along line 88 to the solenoid 68 of actuator 66. In response, selected coils in the solenoid 68 are energized to shift the slide rod 72 and therefore, the gate 74 into the first operative position shown in FIG. 3a; i.e., the solenoid moves the gate to extend over and seal the opening 78 to the bypass track 40. Accordingly, the decoupler 44 is free to move in its passage in the partition 38 so as to provide passive tuning, decoupling and isolation of certain low or small amplitude, higher frequency vibrations.

In contrast, as described above, high and medium amplitude vibrations cause the decoupler 44 to seat alternately against the plates 58, 60 of the partition 38. This seating causes fluid to flow between the chambers 54, 56 through the damping track 42. This produces the desired increased damping to control the engine. More particularly, the passively tuned damping effect is provided in accordance with the designed resonance of the column of liquid in the damping track 42. It will be remembered that the length and cross-sectional area of the track 42 may be adjusted to provide damping of the selected resonance frequency or range of frequencies, for the particular application.

Upon the sensing of an engine idle speed and a vehicle speed of zero, the microprocessor controller 80 sends a control signal along line 86 causing the coils in the solenoid 68 to energize in a necessary manner to draw the slide rod 72 to the fully retracted position (FIG. 3b). In this second operative position, the tapered leading edge 76 of the gate 74 engages under the annular lip 45 of the decoupler 44. It should be appreciated that the tapered edge 76 functions as a cam or wedge to raise and skew the decoupler 44 upward relative to the partition 38. This serves to disable the decoupler itself and substantially seal the decoupler passage. Simultaneously, the opening 78 leading to the bypass track 40 is opened.

As a result of this switching action, damping fluid passes between the primary and secondary chambers 54, 56 primarily through the bypass track 40. More particularly, the bypass track 40 provides a direct flow passage between the chambers 54, 56. The bypass track 40 is of a sufficient size to provide minimum resistance to flow. Accordingly, flow through the damping track 42 is effectively cut off and a tuned, very soft mount is provided to isolate low amplitude, higher frequency idle vibrations, particularly at the low end (10 to 25 Hz) of the operative range. Thus, the dynamic rate/dynamic stiffness of the mount assembly is reduced. The resulting improved isolation, and thus comfort, is particularly noticeable to passengers in the vehicle with the vehicle at rest.

In further contrast, upon the sensing of low amplitude, relatively higher frequency vibrations, such as at the upper end of the 10 to 200 Hz range, the microprocessor controller 80 sends a control signal along line 86 causing other selected coils in the solenoid 68 to energize thereby moving the slide rod 72 to an intermediate position (FIG. 3c). In this third operative position, the opening 78 to the bypass track 40 remains open and the decoupler 44 remains free for reciprocation in the partition 38. Relatively smooth, turbulent-free flow is maintained between the primary and secondary chambers 58, 56 through the bypass track 40. More specifically, flow through the bypass track 40 relieves dynamic pressure buildup in the primary chamber 54, and thereby maintains or restores full flow between the chambers, including around the decoupler. Accordingly, the lowest dynamic rate is provided to isolate small amplitude, relatively higher frequency vibrations.

In contrast, in prior art mount designs, the dynamic rate significantly increases above 50 Hz due to the turbulent flow and pressure buildup that is believed to result from certain conditions during the rapid reciprocation of the decoupler 44. More particularly, the turbulence first effectively restricts and then eventually chokes off flow around the decoupler through the decoupler passage. In prior art designs this has led to the described pressure buildup in the primary chamber that increases the stiffness of the mount substantially. Advantageously, by maintaining the bypass track 40 open in the mount assembly 10 of the present design, pressure relief is provided and the prior art problem, especially of noise transmission, at these higher frequencies is avoided.

Figure 5:
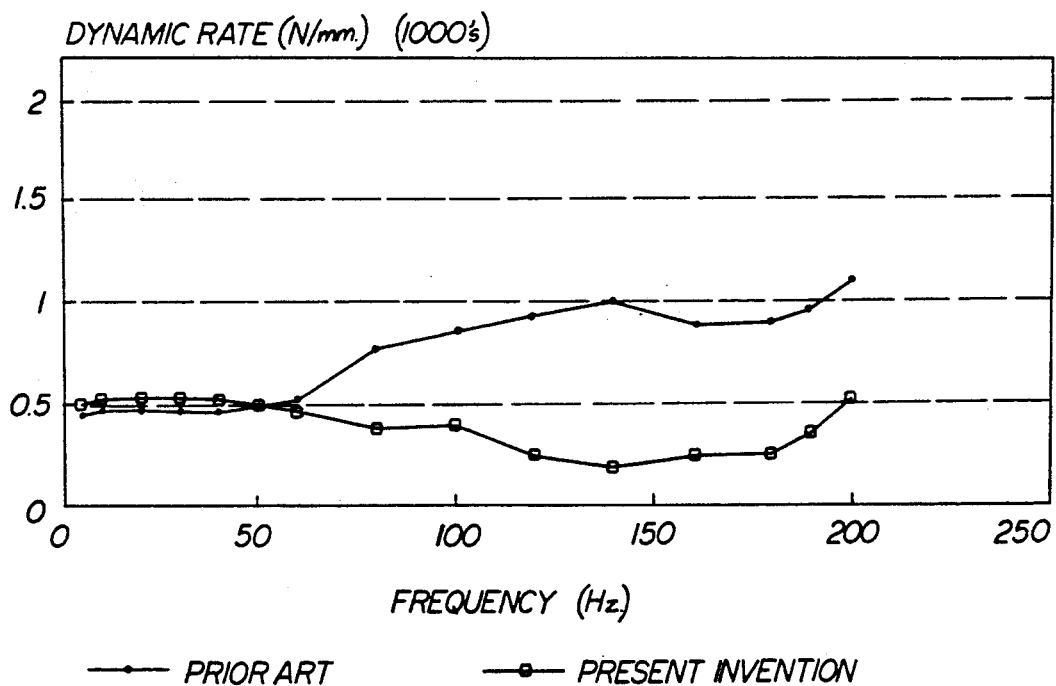
FIG. 5 is a graphical representation showing how the dynamic rate (in terms of stiffness) of one example of the present mount assembly may be lowered (in a frequency range from 50 to 200 Hz) when compared to the stiffness of a comparable state of the art mount assembly.

This is best appreciated from viewing FIG. 5, wherein dynamic rate versus frequency for a hydraulic mount assembly 10 with a $-1100N$ preload and a vibration amplitude of 1 0.1 mm is plotted. As shown, a prior art mount including a single decoupler and a single orifice track provides a relatively constant vertical dynamic rate between approximately 0.48 and 0.5 N/mm (in thousands) over the range of frequencies from 5 to 50 Hz. As frequency increases however, the dynamic rate of the prior art mount also increases rising to approximately 1.0 N/mm (thousands) at approximately 140 Hz and approximately 1.2 N/mm (thousands) at 200 Hz.

In stark contrast, the mount assembly 10 of the present invention maintains a dynamic rate of approximately 0.5 N/mm (thousands) from 5 to 50 Hz. At approximately 50 Hz, the pressure that would otherwise build from the establishment of turbulent flow around the decoupler is relieved through the bypass track 40 so that the dynamic rate stays below the 0.5 N/mm (thousands) and generally level or flattened all the way to 200 Hz. In fact, an actual dip in dynamic rate is provided between approximately 50 and 200 Hz for still further enhancement of noise isolation, and consequently a smoother ride. Of course, the frequency at which the pressure relief occurs and the dip is initiated may be adjusted by altering any number of physical dimensions of the mount assembly, but more notably, the size and- /or length of the bypass track 40, in order to meet particular application requirements.

In summary, numerous benefits result from employing the concepts of the present invention. The hydraulic mount assembly 10 utilizes the best combination of passive and active systems to provide improved tuned performance characteristics. During normal, smooth engine operation, the decoupler 44 provides passive tuning in the form of decoupling. Thus, in response to generally low amplitude, higher frequency vibrations, no damping takes place.

In contrast, high and even medium amplitude, low frequency vibrations including those incurred during fast acceleration or panic stops, result in the decoupler seating against the partition plates 58, 60. Consequently, damping fluid flow is forced to occur through the damping orifice track 42, and the required damping action is produced to control the engine and minimize noise transmission.

In a second position and fourth operative mode, the mount assembly 10 provides enhanced low end tuning by disabling the decoupler 44, so that it is held against the partition plates 58, 60 in a manner that substantially seals the decoupler passage. Low amplitude, low-end frequency vibrations, such as occur during engine idling with the vehicle stationary are then very effectively isolated by allowing flow between the primary and secondary chambers 56, 58, now substantially exclusively through the bypass track 40.

In a third position and fifth operative mode, the mount assembly provides enhanced high end tuning; that is, isolation of low amplitude, relatively higher frequency vibratory inputs. More particularly, the gate 74 is placed in an intermediate position so that the bypass track 40 remains open and the decoupler 44 remains free for reciprocation. As the frequency of the vibratory input increases, turbulence resulting from the rapid reciprocation of the decoupler no longer tends to block the passage of fluid around the decoupler through the decoupler passage. Instead, free flow through the relatively large bypass track 40 is available, thus maintaining a soft mount for the desired better vibration isolation at this resonant vibration or range.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

The embodiments of the invention in which an exclusive property or privilege is claimed are defined as follows:

1. A hydraulic mount assembly for an operating component of a vehicle, comprising:
   a pair of mounting members;
   a hollow body connected to said mounting members;
   a resilient diaphragm closing said hollow body and forming therewith a closed cavity that is filled with a damping liquid;
   means for partitioning said cavity into a primary chamber and a secondary chamber enclosed by said diaphragm;
   a damping orifice track in said partitioning means providing fluid communication between said primary and secondary chambers;
   a bypass track in said partitioning means, also providing fluid communication between said primary and secondary chambers;
   a decoupler received in a passage in said partitioning means for reciprocating movement therein;
   actuating means for selectively engaging/disengaging said decoupler and selectively opening/closing said bypass track;
   means for sensing vehicle operating conditions; and
   control means responsive to said sensing means for positioning said actuating means in one of three operative positions including (1) a first position wherein said actuating means releases said decoupler for reciprocation and closes said bypass track to provide normal damping characteristics, (2) a second position wherein said actuating means disables said decoupler, seals said decoupler passage, and opens said bypass track to provide a low dynamic rate for isolation of low amplitude/higher frequency vibrations; and (3) a third position wherein said actuating means releases said decoupler and opens said bypass track to provide a low dynamic rate for suppression of low amplitude, still higher frequency vibration/noise.

2. A hydraulic mount assembly for an operating component of a vehicle, comprising:
   a pair of mounting members;
   a hollow body connected to said mounting members;
   a resilient diaphragm closing said hollow body and forming therewith a closed cavity that is filled with a damping liquid;
   means for partitioning said cavity into a primary chamber and a secondary chamber enclosed by said diaphragm;
   a damping orifice track in said partitioning means providing fluid communication between said primary and secondary chambers;
   a bypass track in said partitioning means, also providing fluid communication between said primary and secondary chambers;
   a decoupler received in a passage in said partitioning means for reciprocating movement therein;
   actuating means for selectively engaging/disengaging said decoupler and selectively opening/closing said bypass track, said actuating means including a solenoid, a slide rod and a gate mounted to a distal end of said slide rod;
   means for sensing vehicle operating conditions; and
   control means responsive to said sensing means for positioning said actuating means in one of three operative positions including (1) a first position wherein said gate means releases said decoupler for reciprocation and closes said bypass track to provide normal damping characteristics, (2) a second position wherein said gate means disables said decoupler, sealing said decoupler passage, and opens said bypass track to provide a low dynamic rate for isolation of low amplitude/higher frequency vibrations; and (3) a third position wherein said gate means releases said decoupler and opens said bypass track to provide a low dynamic rate for suppression of low amplitude, still higher frequency vibration/noise.

3. A hydraulic mount assembly for an operating component of a vehicle, comprising:

a pair of mounting members;

a hollow body connected to said mounting members;

a resilient diaphragm closing said hollow body and forming therewith a closed cavity that is filled with a damping liquid;

means for partitioning said cavity into a primary chamber and a secondary chamber enclosed by said diaphragm;

a damping orifice track in said partitioning means providing fluid communication between said primary and secondary chambers;

a bypass track in said partitioning means, also providing fluid communication between said primary and secondary chambers;

a spool decoupler received in a passage in said partitioning means for reciprocating movement therein;

actuating means for selectively releasing/disabling said decoupler and selectively opening/closing said bypass track, said actuating means including a solenoid, a slide rod and a gate mounted to a distal end of said slide rod, said gate including a tapered end for engaging in said spool decoupler;

means for sensing vehicle operating conditions; and control means responsive to said sensing means for positioning said actuating means in one of three operative positions including (1) a first position wherein said gate means releases said decoupler for reciprocation and closes said bypass track to provide normal damping characteristics, (2) a second position wherein said gate means disables said decoupler and prevents reciprocation, seals said decoupler passage, and opens said bypass track to provide a low dynamic rate for isolation of low amplitude/higher frequency vibrations; and (3) a third position wherein said gate means releases said decoupler and opens said bypass track to provide a low dynamic rate for suppression of low amplitude, still higher frequency vibration/noise.

* * * * *